United States Patent
Zeng et al.

(10) Patent No.: US 9,599,706 B2
(45) Date of Patent: Mar. 21, 2017

(54) FUSION METHOD FOR CROSS TRAFFIC APPLICATION USING RADARS AND CAMERA

(71) Applicant: GM GLOBAL TECHNOLOGY OPERATIONS LLC, Detroit, MI (US)

(72) Inventors: Shuqing Zeng, Sterling Heights, MI (US); Wei Tong, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 10 days.

(21) Appl. No.: 14/679,995

(22) Filed: Apr. 6, 2015

(65) Prior Publication Data
US 2016/0291149 A1    Oct. 6, 2016

(51) Int. Cl.
*G01S 13/93* (2006.01)
*G01S 13/86* (2006.01)
*B60Q 9/00* (2006.01)
*B60T 7/22* (2006.01)
*B60W 30/08* (2012.01)

(52) U.S. Cl.
CPC ............ *G01S 13/931* (2013.01); *B60Q 9/008* (2013.01); *B60T 7/22* (2013.01); *B60W 30/08* (2013.01); *G01S 13/867* (2013.01); *B60T 2201/022* (2013.01)

(58) Field of Classification Search
CPC ..... G01S 13/931; G01S 13/867; B60Q 9/008; B60T 7/22; B60W 30/08
See application file for complete search history.

(56) References Cited

U.S. PATENT DOCUMENTS

| | | | | |
|---|---|---|---|---|
| 5,963,653 | A * | 10/1999 | McNary | G01S 7/417 342/109 |
| 6,661,345 | B1 * | 12/2003 | Bevan | G08B 21/06 340/575 |
| 6,859,705 | B2 * | 2/2005 | Rao | B60R 21/013 280/728.1 |

(Continued)

OTHER PUBLICATIONS

"Radar Basics—Radial Speed", Radar Tutorial website, published date unknown, all pages, retrieved from http://www.radartutorial.eu/11.coherent/Radial%20Speed.en.html.*

(Continued)

*Primary Examiner* — Calvin Cheung
(74) *Attorney, Agent, or Firm* — John A. Miller; Miller IP Group, PLC (57) ABSTRACT

A method and system are disclosed for tracking objects which are crossing behind a host vehicle. Target data from a vision system and two radar sensors are provided to an object detection fusion system. Salient points on the target object are identified and tracked using the vision system data. The salient vision points are associated with corresponding radar points, where the radar points provide Doppler radial velocity data. A fusion calculation is performed on the salient vision points and the radar points, yielding an accurate estimate of the velocity of the target object, including its lateral component which is difficult to obtain using radar points only or traditional vision system methods. The position and velocity of the target object are used to trigger warnings or automatic braking in a Rear Cross Traffic Avoidance (RCTA) system.

18 Claims, 10 Drawing Sheets

(56) References Cited

U.S. PATENT DOCUMENTS

| | | | | |
|---|---|---|---|---|
| 6,871,145 B2* | 3/2005 | Altan | ............... | G08G 1/166 340/436 |
| 6,898,331 B2* | 5/2005 | Tiana | ............... | G06T 5/50 345/617 |
| 6,944,543 B2* | 9/2005 | Prakah-Asante | ...... | G08G 1/166 180/167 |
| 8,106,755 B1* | 1/2012 | Knox | ............... | B60Q 9/008 340/435 |
| 8,232,872 B2 | 7/2012 | Zeng | | |
| 2003/0060980 A1* | 3/2003 | Prakah-Asante | ...... | G08G 1/166 701/301 |
| 2003/0102997 A1* | 6/2003 | Levin | ............... | G01S 7/006 342/57 |
| 2005/0007261 A1* | 1/2005 | Berson | ............... | G01C 23/00 340/945 |
| 2005/0169529 A1* | 8/2005 | Owechko | ............ | G06K 9/6254 382/190 |
| 2005/0273212 A1* | 12/2005 | Hougen | ............ | G06K 9/00805 701/1 |
| 2006/0104481 A1* | 5/2006 | Demro | ............... | B60R 21/0134 382/104 |
| 2006/0119473 A1* | 6/2006 | Gunderson | ............ | B60Q 9/006 340/435 |
| 2007/0252749 A1* | 11/2007 | Blaskovich | ............ | G01S 7/12 342/29 |
| 2008/0036855 A1* | 2/2008 | Heenan | ............... | G06K 9/00791 348/61 |
| 2008/0243389 A1* | 10/2008 | Inoue | ............... | G08G 1/165 701/301 |
| 2009/0002222 A1* | 1/2009 | Colburn | ............... | G01C 9/00 342/145 |
| 2009/0292468 A1* | 11/2009 | Wu | ............... | G01S 13/726 701/301 |
| 2010/0191391 A1* | 7/2010 | Zeng | ............... | G01S 13/723 701/1 |
| 2011/0255741 A1* | 10/2011 | Jung | ............... | G06K 9/00369 382/103 |
| 2012/0185212 A1* | 7/2012 | Ekelin | ............... | G01D 21/00 702/182 |
| 2014/0139655 A1* | 5/2014 | Mimar | ............... | G08B 21/0476 348/77 |
| 2016/0068104 A1* | 3/2016 | McMahon | ............ | H04N 7/181 348/36 |
| 2016/0148062 A1* | 5/2016 | Fursich | ............... | B60R 1/00 348/36 |

OTHER PUBLICATIONS

"Radar Velocity", University of Illinois website, published date unknown, all pages, retrieved from http://ww2010.atmos.uiuc.edu/(Gh)/guides/rs/rad/basics/rvel.rxml.*

* cited by examiner

FUSION METHOD FOR CROSS TRAFFIC APPLICATION USING RADARS AND CAMERA

BACKGROUND OF THE INVENTION

Field of the Invention

This invention relates generally to a multiple-input object detection system and, more particularly, to a rear cross traffic avoidance system which combines camera-based and radar-based object data to track rear cross traffic objects, including a more accurate estimation of lateral velocity of the objects than would be possible with radar data alone.

Discussion of the Related Art

Object detection systems, also known as object sensing systems, have become increasingly common in modern vehicles. Object detection systems can provide a warning to a driver about an object in the path of a vehicle. Object detection systems can also provide input to active vehicle systems—such as Adaptive Cruise Control, which controls vehicle speed to maintain appropriate longitudinal spacing to a leading vehicle, and Rear Cross Traffic Avoidance systems, which can provide both warnings and automatic braking to avoid a collision with an object behind a host vehicle when the host vehicle is backing up.

Object detection systems use one or more sensors, which may be radar, lidar, camera, or other technologies, to detect the presence of an object in or near the path of a host vehicle. Software is used to track the relative motion of objects over time, determine if the objects are moving or stationary, determine what each object is likely to be (another vehicle, a pedestrian, a tree, etc.), and determine whether each object poses a collision threat to the host vehicle.

However, even with multiple object sensing inputs, such as radar and camera, it is not always possible to accurately estimate the heading of a remote vehicle or object, especially if the remote vehicle or object is moving in a predominantly lateral or tangential direction relative to the host vehicle. Furthermore, in some situations, it is difficult to accurately correlate radar point data with camera image data. Fusion techniques are needed which provide accurate two-dimensional velocity of remote vehicles and objects, using object data from a camera and two radar sensors.

SUMMARY OF THE INVENTION

In accordance with the teachings of the present invention, a method and system are disclosed for tracking objects which are crossing behind a host vehicle. Target data from a vision system and two radar sensors are provided to an object detection fusion system. Salient points on the target object are identified and tracked using the vision system data. The salient vision points are associated with corresponding radar points, where the radar points provide Doppler radial velocity data. A fusion calculation is performed on the salient vision points and the radar points, yielding an accurate estimate of the velocity of the target object, including its lateral component which is difficult to obtain using radar points only or traditional vision system methods. The position and velocity of the target object are used to trigger warnings or automatic braking in a Rear Cross Traffic Avoidance (RCTA) system.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method and apparatus for tracking objects in proximity to a host vehicle using a fusion of salient vision points and radar points is merely exemplary in nature, and is in no way intended to limit the invention or its applications or uses.

Many modern vehicles include an object sensing system for detecting objects in the path of the vehicle. The object sensing system can provide a warning to a driver, or even trigger other systems to take action to avoid a vehicle collision. Some vehicles also include an object sensing fusion system, which numerically "fuses" the data from two or more object detection sensors and then bases its object detection logic on the fused object data. One such fusion system is described in U.S. Pat. No. 7,460,951, titled "System and method of target tracking using sensor fusion", which is assigned to the assignee of the present application, and which is hereby incorporated by reference in its entirety.

Figure 1:
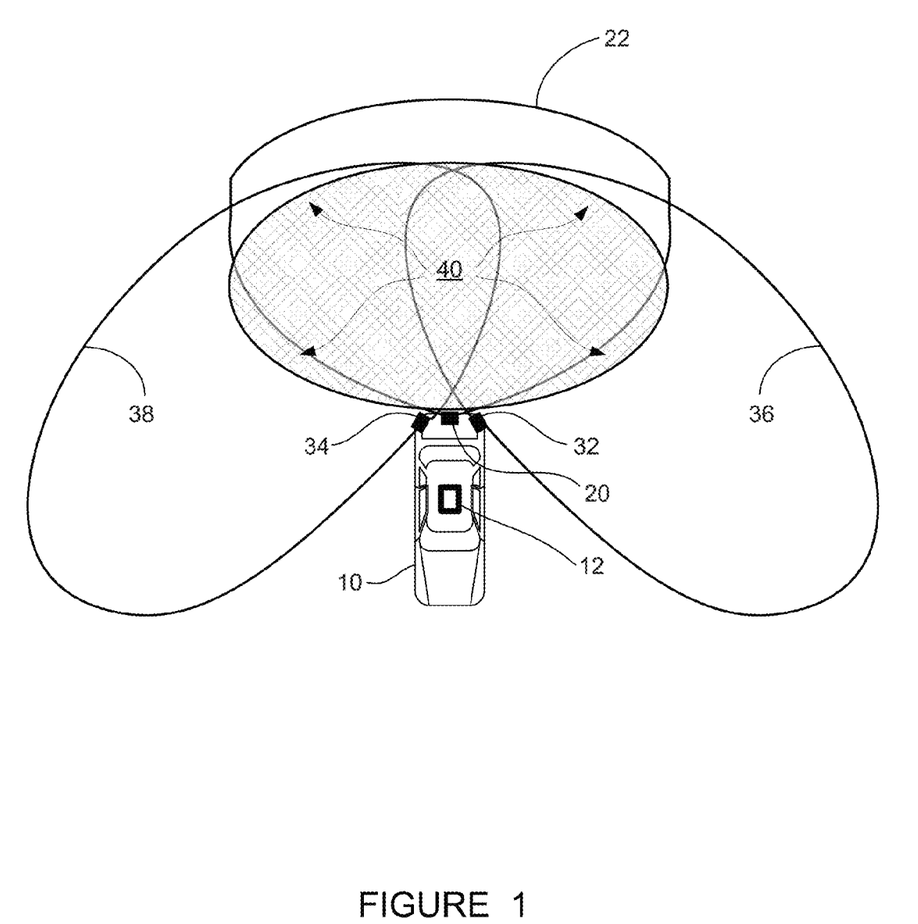
FIG. 1 is a schematic diagram of a host vehicle including multiple object detection sensors.

FIG. 1 is a schematic diagram of a host vehicle 10 including multiple object detection sensors. The host vehicle 10 includes an object sensing fusion system 12, which receives data from a camera 20 and a pair of radar sensors 32 and 34. The fusion system 12 comprises a device including a microprocessor and a memory module, said device being configured with software to perform object sensing fusion—as described in detail below. Other applications, besides object sensing fusion, may also run on the same microprocessor as the fusion system 12.

The camera 20 provides images to the fusion system 12 (or to a dedicated vision system, not separately shown), where the images are processed to detect, identify and track remote objects. Similarly, the radar sensors 32/34 provide their radar return data to the fusion system 12 (or to a dedicated radar tracking system, not separately shown), where the radar points are processed to detect, identify and track remote objects. The camera 20 and the radar sensors 32/34 typically communicate with and provide their data to the fusion system 12 by a wired connection over a vehicle bus, but this communication could be wireless.

The camera 20 has a field of view 22. The radar sensors 32/34 have coverage areas 36 and 38, respectively. In the FIG. 1 illustration, the camera 20 and the radar sensors 32/34 are oriented in a rearward direction, and the following discussion is directed to a rear cross traffic detection application. However, the techniques could also be applied to forward-view or side-view orientations and applications. It is to be noted that only remote vehicles or objects which exist in locations where the camera field of view 22 overlaps with the radar coverage areas 36 or 38 can be used for object fusion. This overlapping coverage area, where both the camera 20 and one of the radar sensors 32/34 can detect a target, is shown by oval 40 in FIG. 1. The sizes and shapes of the field of view 22, the radar coverage areas 36/38 and the overlapping coverage oval 40 are all shown conceptually in FIG. 1, as would be understood by one skilled in the art.

However, even with two or more object sensors, it may be difficult for a traditional object sensing fusion system to accurately determine the two-dimensional (2-D) velocity of a remote vehicle or object, particularly if the remote vehicle or object is moving in a predominantly lateral (or tangential) direction relative to a host vehicle. The nature of this problem is illustrated in FIGS. 2 and 3.

Figure 2:
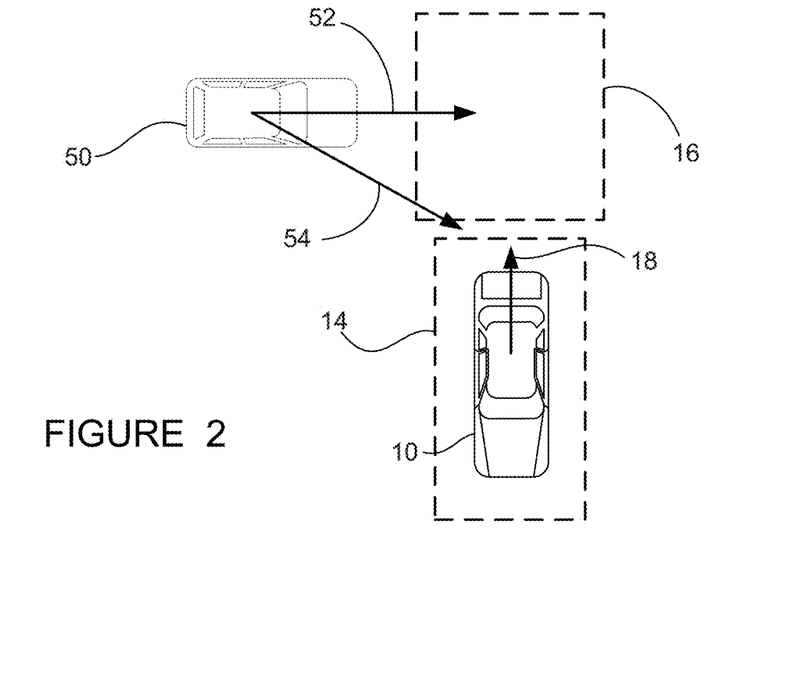
FIG. 2 is an illustration of the host vehicle of FIG. 1, along with a remote vehicle, showing how the velocity vector of the remote vehicle affects its incursion into a warning zone or braking envelope of the host vehicle.

FIG. 2 is an illustration of the host vehicle 10 of FIG. 1, along with a remote vehicle 50. FIG. 2 depicts a typical parking lot scenario, where the host vehicle 10 is backing up as indicated by velocity arrow 18, and the remote vehicle 50 is driving towards a position behind the host vehicle 10 that may cause a conflict. In rear cross traffic avoidance (RCTA) systems, the host vehicle 10 may have a brake envelope 14 defined about it, where the brakes of the host vehicle 10 may be automatically applied if the host vehicle 10 is moving and an object enters the brake envelope 14. The host vehicle 10 may also have a warning zone 16 defined, where an audible and/or visual warning is issued to the driver of the host vehicle 10 if an object enters the warning zone 16.

The velocity of the remote vehicle 50 is an important parameter to be known by the RCTA system. This is because the RCTA system needs the velocity of the remote vehicle 50 in order to determine an estimated "time to enter" the warning zone 16 and/or the brake envelope 14. In addition, the position of the warning zone 16 may be based upon the velocity of the remote vehicle 50. It can be clearly seen in FIG. 2 that the warning and actions taken by the RCTA system would be very different if the remote vehicle 50 has a first velocity 52 than if the remote vehicle 50 has a second velocity 54. Thus, it is apparent that an accurate 2-D velocity of the remote vehicle 50 is needed.

Figure 3:
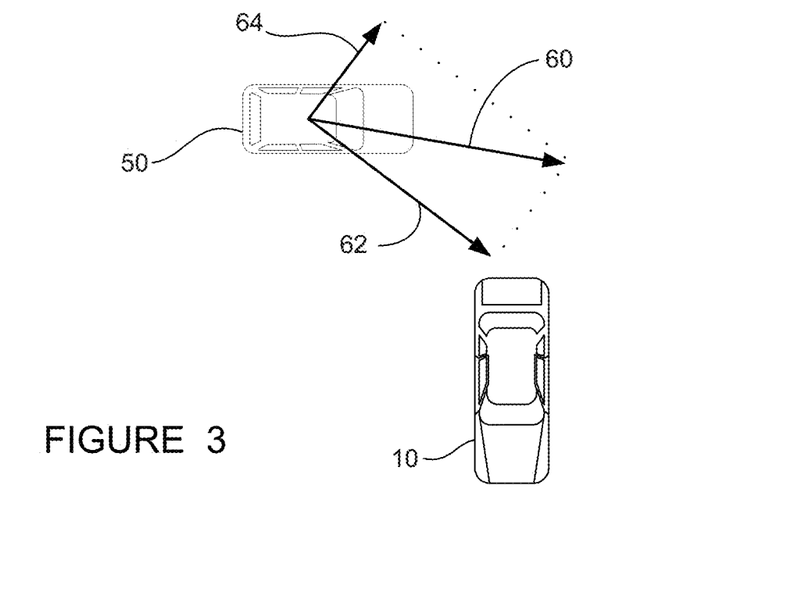
FIG. 3 is an illustration of the host vehicle and the remote vehicle of FIG. 2, further illustrating the difficulty in obtaining an accurate 2-D velocity of the remote vehicle.

FIG. 3 is an illustration of the host vehicle 10 and the remote vehicle 50, further illustrating the difficulty in obtaining an accurate 2-D velocity of the remote vehicle 50. In FIG. 3, the remote vehicle 50 has an actual velocity v designated by arrow 60. The actual velocity v can be considered to be comprised of two orthogonal components—a radial velocity designated by arrow 62 and a tangential velocity designated by arrow 64. The radar sensors 32/34 typically include Doppler capability, where radar returns not only indicate the location of an object point but also the radial velocity $\dot{r}$ of the point. Thus, the radial velocity $\dot{r}$ of points on the remote vehicle 50 can be accurately determined from radar sensor data. However, it is difficult to estimate the tangential velocity through conventional target tracking. This is because the remote vehicle 50 is a large object which cannot be considered a point target. Because the radar sensors 32/34 will sense many radar return points from the remote vehicle 50, and each scan may return different points, azimuth angle measurement is uncertain. This in turn leads to tangential velocity uncertainty.

Image-based object detection systems are better suited to estimating tangential velocity of a target, by calculating movement of the target in the image plane over a period of time. However, in the case of a vehicle such as the remote vehicle 50, traditional techniques for doing this are often unsatisfactory; this is because the apparent lateral motion of the target in the image plane can be affected by radial velocity (which causes the target to appear larger or smaller in subsequent frames), or by frame-to-frame differences in cropping of the vehicle outline.

From the above discussion, is it apparent that an improved fusion/tracking technique is needed which can accurately estimate the 2-D velocity of the remote vehicle 50. Such a technique can be realized by fusing camera image data (i.e., vision data) with radar return data. In the fusion technique discussed below, the radar return data provides accurate radial velocity, as described above. At the same time, salient points (i.e., prominent or conspicuous points) in the camera image data can provide accurate lateral or tangential velocity. That is, instead of merely treating the remote vehicle 50 as a single object for tracking purposes, multiple features from the remote vehicle 50 are individually tracked in the images. In order to improve the quality and reliability of the results, salient vision points can be associated with radar points using position proximity in the image plane, and using previously estimated object velocity as cueing. Salient vision points with different lateral speed than expected based on current and previous measurements can be removed from the calculation.

In the technique disclosed here, salient vision points on the remote vehicle 50 may include Harris corners (locations of locally maximal intensity variation, such as where a vehicle A-pillar meets a hoodline/doorline), wheels, head lights, tail lights, door handles, external mirrors, and any Maximally Stable Extremal Region (MSER) or other prominent features. Scale Invariant Feature Transform (SIFT) techniques may also be used to detect and describe salient vision points in the images. Features from Accelerated Segment Test (FAST), a corner detection method, could be used to extract salient points and later used for tracking and velocity estimation. Binary Robust Independent Elementary Features (BRIEF) and Oriented FAST and Rotated BRIEF (ORB) can be used for detection of feature points for objects.

Figure 4:
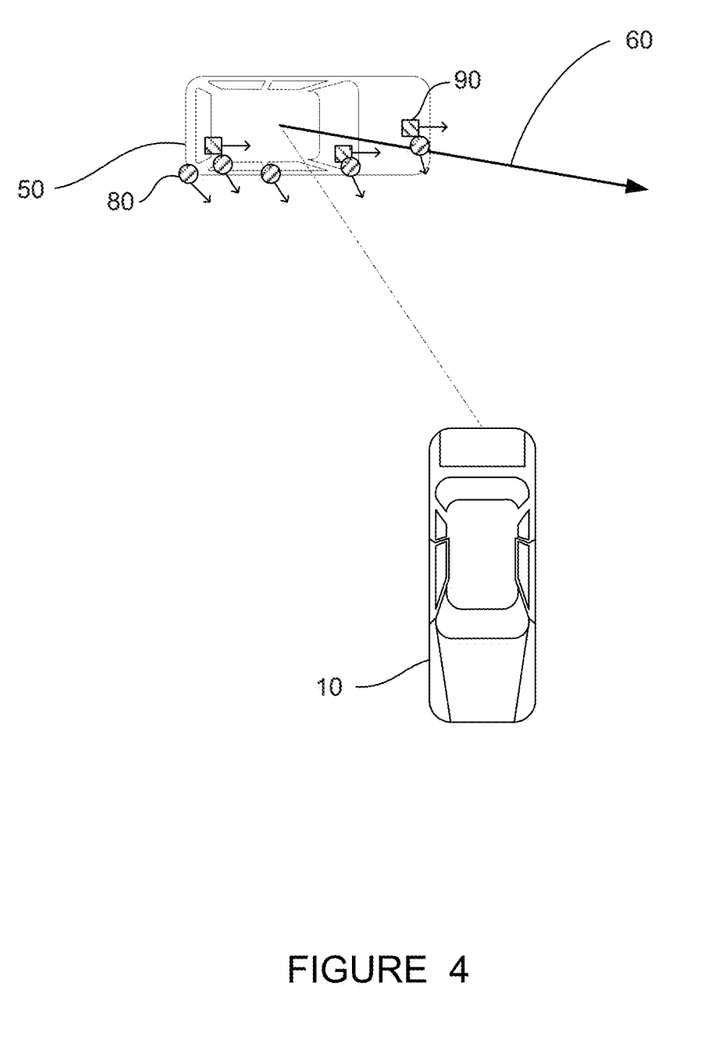
FIG. 4 is another illustration of the host vehicle and the remote vehicle, showing salient vision points and radar points which are used by an object sensing fusion system on the host vehicle to determine velocity of the remote vehicle.

FIG. 4 is another illustration of the host vehicle 10 and the remote vehicle 50, showing salient vision points and radar points which are used in the ensuing discussion. In FIG. 4, the remote vehicle 50 again has a velocity v represented by the arrow 60. The radar sensors 32/34 onboard the host vehicle 10 detect a number of radar points, shown as circles 80, and the camera 20 detects a number of salient vision points, shown as squares 90. As indicated by the small arrows, the radar points will include Doppler radial velocity (ṙ) data, and the salient vision points will have an apparent motion flow across the image plane which correlates to lateral velocity. A technique for associating the salient vision points and radar points and fusing the data to produce an accurate estimate of the velocity v is discussed in detail below.

Figure 5:
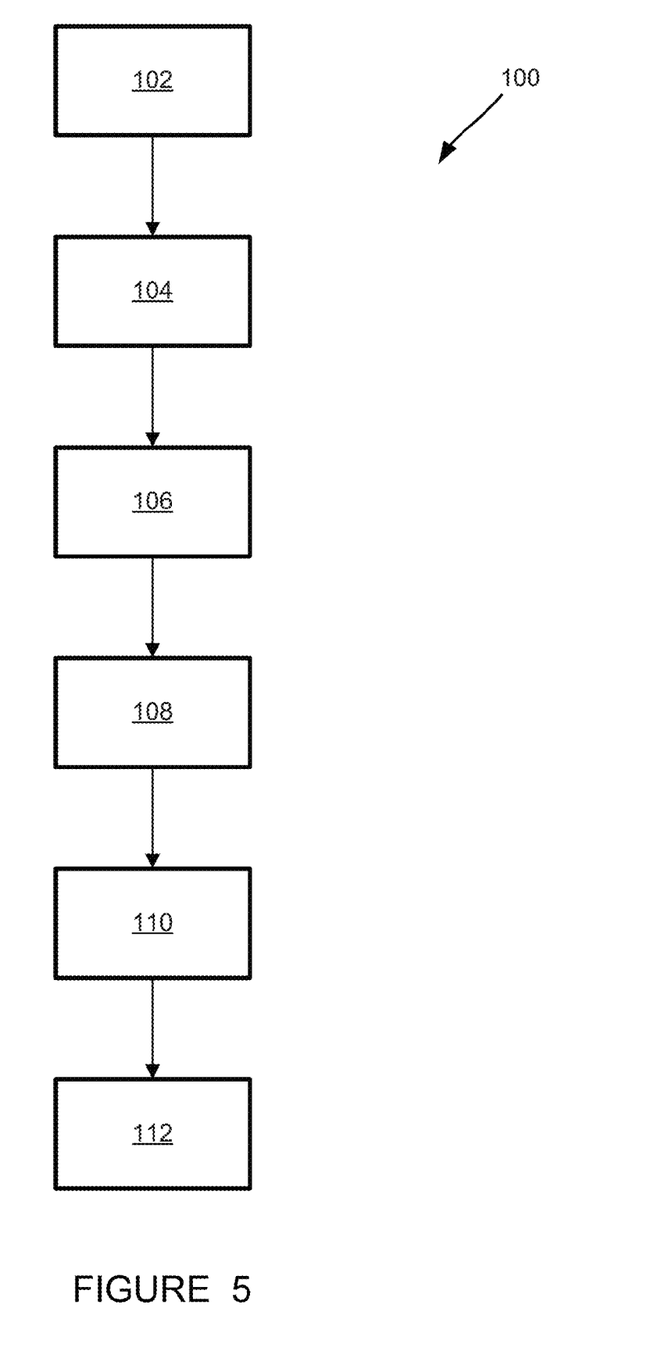
FIG. 5 is a flowchart diagram of a method for calculating a velocity of a remote object relative to a host vehicle using a fusion of salient vision points with radar points.

FIG. 5 is a flowchart diagram 100 of an overall method for calculating a velocity of a remote object relative to a host vehicle using a fusion of salient vision points with radar points. At box 102, data is provided by the camera 20 and the radar sensors 32/34. For the purposes of this discussion, the data from the box 102 is provided to, and all subsequent calculations are performed on, the fusion system 12—which includes a microprocessor and a memory module as discussed previously. In actual implementation on a vehicle, the calculations could be performed on any suitable controller or processor, or could be distributed across more than one processor.

Figure 6:
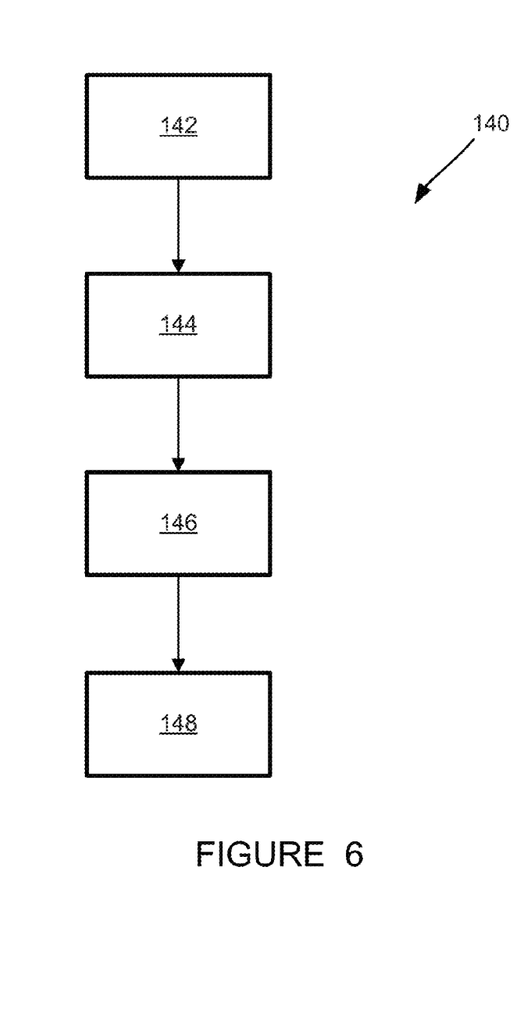
FIG. 6 is a flowchart diagram of a method for tracking salient vision points on a remote object from camera images.

At box 104, radar data is used for cueing or triggering the subsequent calculations. That is, if an object is detected by the radar sensors 32/34 in a region of interest (ROI) behind the host vehicle 10, this cues the process to continue with the velocity fusion calculations. At box 106, salient vision points are identified and tracked using the camera image data. FIG. 6 is a flowchart diagram 140 of a method for tracking salient points on a remote object from camera images. The method of FIG. 6 is implemented at the box 106 of FIG. 5. At box 142, salient vision points in the region of interest are detected from an image frame. As discussed above, the salient vision points are prominent features of the object (in this case, the remote vehicle 50)—such as pillar ends, wheels, head lights, etc.

At box 144, a correspondence between two temporally adjacent image frames is built. That is, salient vision points which can be identified in a first image frame and the next image frame are noted. Of course, the salient points will have moved in the image plane from one image to the next, and they will not appear identical (pixel for pixel) for many reasons—including change of perspective, change of lighting/reflection, etc. At box 146, salient vision points which are stable (that is, moving in a predictable manner) across image frames are detected. A method for detecting spatio-temporally stable salient vision points using a minimal cost flow network was described in U.S. patent application Ser. No. 13/535,538, titled "WIDE BASELINE BINOCULAR OBJECT MATCHING METHOD USING MINIMAL COST FLOW NETWORK", filed 28 Jun. 2012, assigned to the assignee of the present invention, and hereby incorporated by reference.

At box 148, the motion flow for each stable salient point is established. The motion flow is not an actual velocity; rather, it is a movement of a salient point in the image plane of the camera 20 from one frame to the next. Knowing the elapsed time between image frames, the motion flow can thus be identified in pixels per second, for example. Per the following discussion, the motion flow of the salient points can be transformed and used in a fusion calculation which does yield velocity of the detected object.

Figure 7:
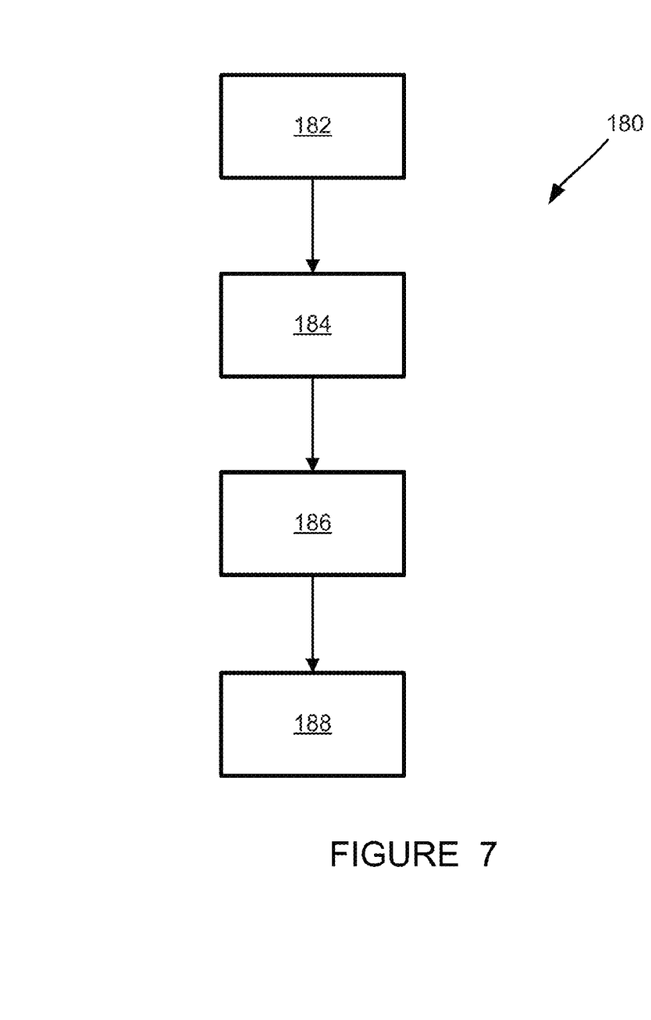
FIG. 7 is a flowchart diagram of a method for associating salient vision points with radar points in an object tracking system.

Returning to FIG. 5, the salient point motion flow data from the flowchart diagram 140 is now available at the box 106. At box 108, the salient vision points from the box 106 are associated with radar points. FIG. 7 is a flowchart diagram 180 of a method for associating salient vision points with radar points in an object tracking system. The method of FIG. 7 is implemented at the box 108 of FIG. 5. At box 182, each radar point $p_i$ is projected to the image plane. That is, $ũ_i=H(p_i)$, where H is the homography transformation from the x-y frame to the image plane, and $ũ_i$ is the projected radar point, assuming these radar points lie on the ground plane. At box 184, a predicted object velocity v (from previous time step) is projected to the image plane as motion flow F. That is, $F=\partial H|_p v$ if the object is at a location p in the x-y frame, where $\partial H|_p$ is the Jacobian matrix of the transformation H computed at locate p. At box 186, salient vision points with a motion flow different than expected are screened out, or removed from subsequent calculations. That is, a j-th vision point is removed from the calculations if $\|f_j-F\|>T$, where $f_j$ is the estimated motion flow of the j-th vision point, and T is a threshold motion flow difference, where T could be either a fixed value or a percentage of F.

At box 188, each of the remaining salient vision points $u_j$ (those not removed at the box 186) is assigned to its nearest radar point (transformed to the image plane) $ũ_i$, where the distance (for determination of nearest) is measured in image pixel columns. As a result of this assignment, $q_j=p_i$ in the x-y frame, where $q_j$ is the projection of the vision point $u_j$ from the image plane to the x-y frame using the homography transformation H, and $p_i$ is the nearest radar point.

Returning to FIG. 5, the salient vision points (numbering M) have now been associated with the radar points (numbering N) at the box 108. At box 110—with the salient vision points and their motion flow $(u_j,f_j)$, and the radar points and their radial velocity $(p_i,ṙ_i)$ identified and associated as described above—the velocity v of the remote vehicle 50 (the object being measured by the salient vision points and the radar points) can be determined by minimizing the following:

$$\sum_{i=1}^{N} \left(\frac{p_i \cdot v}{\|p_i\|} - ṙ_i\right)^2 + \sum_{j=1}^{M} \|\partial H|_{q_j} v - f_j\|^2 \quad (1)$$

Where all of the variables in Equation (1) have been defined and discussed above.

At box 112, the velocity v of the remote vehicle 50 is used in a driver-assistance application such as a rear cross traffic avoidance (RCTA) system. As discussed previously, the velocity v of the remote vehicle 50 may be used to calculate a "time to enter" the warning zone 16 and/or the brake envelope 14, and the position of the warning zone 16 may be based upon the velocity v of the remote vehicle 50. The process of the flowchart diagram 100 continues, and the velocity of the remote vehicle 50 is continually updated using the fusion calculation of Equation (1), as long as an object is detected in the region of interest behind the host vehicle 10.

The velocity calculation employing fusion of salient vision points and radar points—described above—provides more accurate estimation of remote vehicle velocity than traditional object sensing methods. The accurate remote vehicle velocity can be advantageously used in a rear cross traffic avoidance (RCTA) system. This same fusion technique can also be used to track other types of objects—such as bicycles and shopping carts—and to track objects in front-view or side-view applications, wherever a camera field of view overlaps a radar coverage area. All of these capabilities are possible without the necessity for tedious training of object classifiers.

While the technique described above is very effective for detection and tracking of any general object in proximity to a host vehicle, particularly in a rear cross traffic avoidance application, other techniques can be employed for tracking remote vehicles specifically. One such technique takes advantage of the unique motion signature of the wheels on a remote vehicle, and provides enhanced calculation of the remote vehicle's position, velocity and heading.

Figure 8:
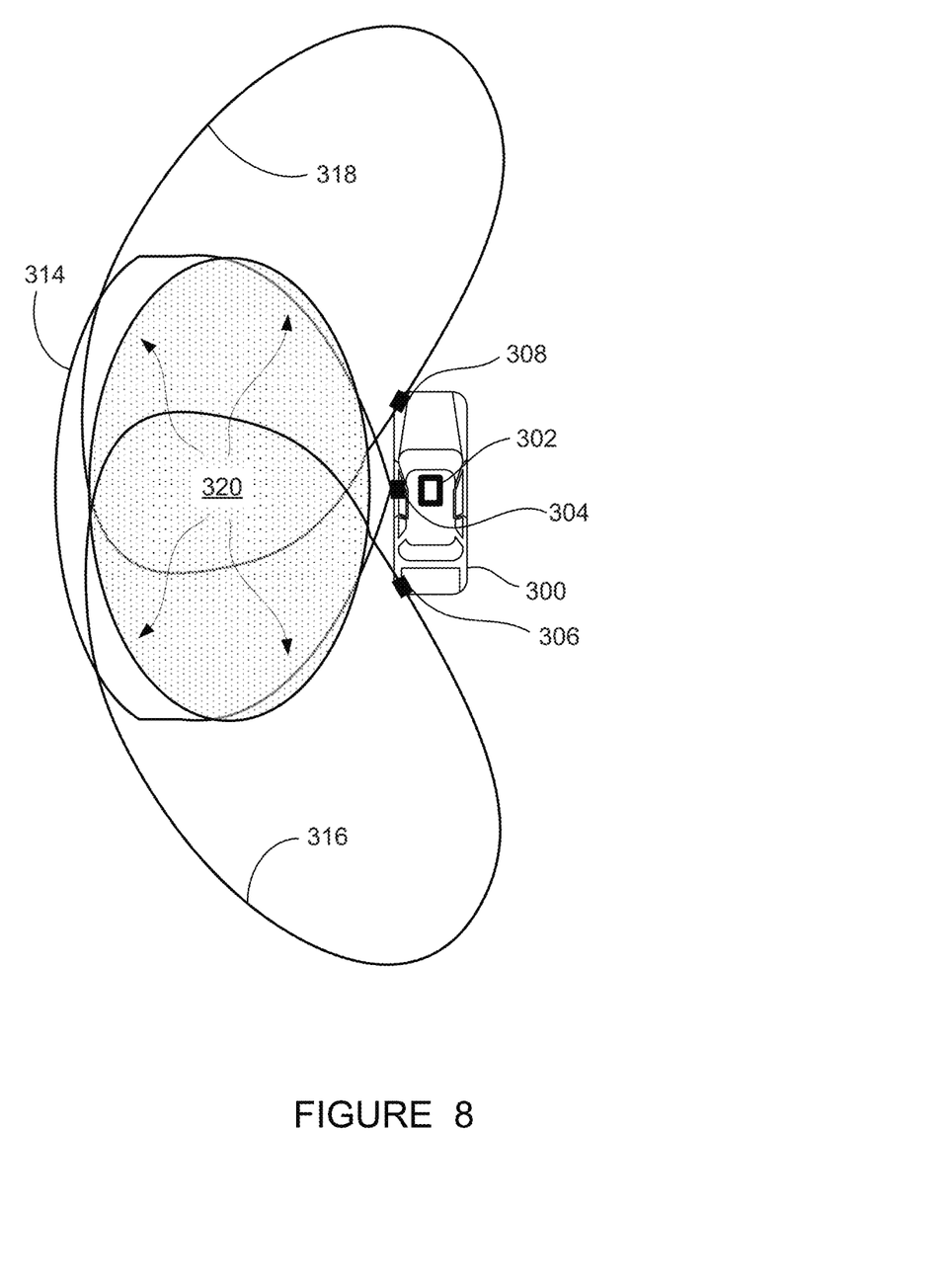
FIG. 8 is a schematic diagram of a host vehicle including multiple object detection sensors in a side view configuration.

FIG. 8 is a schematic diagram of a host vehicle 300 including multiple object detection sensors in a side view configuration. The host vehicle 300 includes an object sensing fusion system 302, which receives data from a camera 304 and a pair of radar sensors 306 and 308. The fusion system 302 comprises a device including a microprocessor and a memory module, said device being configured with software to perform object sensing fusion—as described in detail below. Other applications, besides object sensing fusion, may also run on the same microprocessor as the fusion system 302.

The camera 304 and the radar sensors 306/308 have overlapping coverage areas, and provide their data to the fusion system 302, in a manner similar to that discussed previously with respect to the host vehicle 10 of FIG. 1. As was the case in FIG. 1, the sizes and shapes of a camera field of view 314, radar coverage areas 316/318 and an overlapping coverage oval 320 (within which a remote vehicle can be detected by the camera 304 and at least one of the radar sensors 306/308) are all shown conceptually in FIG. 8, as would be understood by one skilled in the art.

As discussed previously, even with two or more object sensors, it may be difficult for a traditional object sensing fusion system to accurately determine the two-dimensional (2-D) velocity of a remote vehicle, particularly if the remote vehicle is moving in a predominantly lateral (or tangential) direction relative to the host vehicle 300. The nature of this problem, as manifested in a side view or lateral collision prevention situation, is illustrated in FIG. 9.

Figure 9:
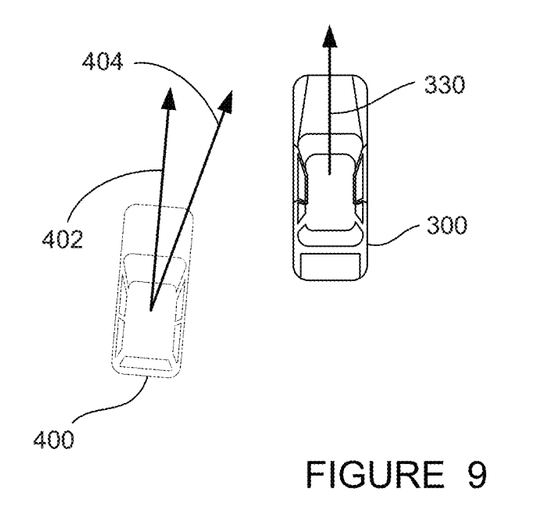
FIG. 9 is an illustration of the host vehicle as depicted in FIG. 8, along with a remote vehicle, where the remote vehicle is driving generally alongside the host vehicle.

FIG. 9 is an illustration of the host vehicle 300 as depicted in FIG. 8, along with a remote vehicle 400. FIG. 9 illustrates a typical multi-lane roadway driving scenario, where the host vehicle 300 is driving as indicated by velocity arrow 330, and the remote vehicle 400 is driving generally alongside the host vehicle 300 but potentially drifting toward the host vehicle 300 in a direction that may cause a conflict. In lateral collision prevention (LCP) systems, the host vehicle 300 may issue a driver warning if the remote vehicle 400 enters a warning zone, or take evasive action (braking and/or steering) if the remote vehicle 400 is determined to pose an imminent collision hazard.

The velocity of the remote vehicle 400 is an important parameter to be known by the LCP system. It can be clearly seen in FIG. 9 that the warning and/or actions taken by the LCP system would be very different if the remote vehicle 400 has a first velocity 402 than if the remote vehicle 400 has a second velocity 404. Thus, it is apparent that an accurate 2-D velocity of the remote vehicle 400 is needed. In the case of a laterally positioned remote vehicle, it is possible to distinctly identify the remote vehicle's wheels, and use the remote vehicle wheel measurements to determine the 2-D remote vehicle velocity, and to simultaneously calibrate the radar sensor aiming angles.

Figure 10:
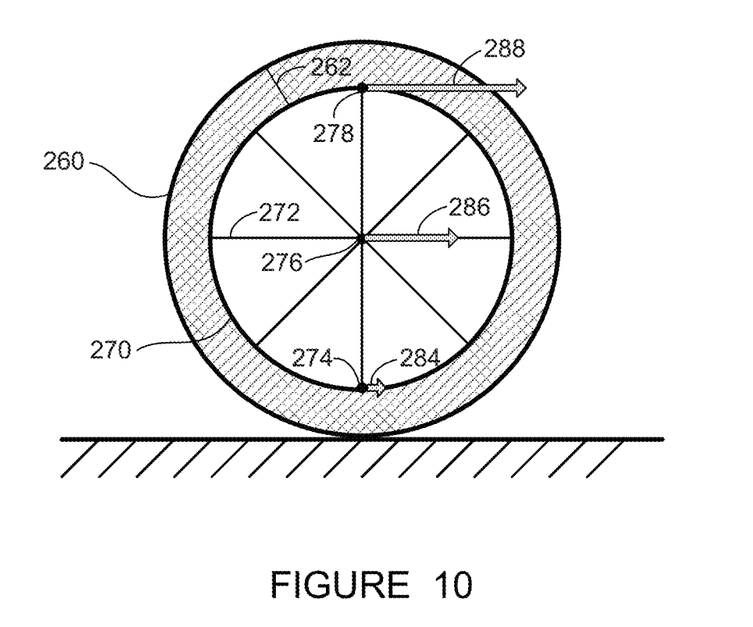
FIG. 10 is a side-view illustration of a tire and wheel rolling on the ground, showing the basic motion properties which can be used to identify wheels in radar sensor data.

FIG. 10 is a side-view illustration of a tire and wheel rolling on the ground, showing the basic motion properties which can be used to identify wheels in radar sensor data. In FIG. 10, a tire 260 with a wheel 270 are rolling on the ground. The wheel 270 has a radius r 272, and the tire 260 has a thickness H 262. An outer radius of the tire, R, is defined as r+H. An analysis of three points on the wheel 270—a wheel bottom point 274, a wheel center point 276, and a wheel top point 278—illustrates how the wheel can be distinctly identified in radar return data. For visualization relative to FIG. 9, consider the tire 260 and the wheel 270 to be on the right-hand side of the remote vehicle 400.

The wheel center point 276 is, of course, moving at the same velocity v (denoted by arrow 286) as the remote vehicle 400. The wheel top point 278, due to the wheel rotation, is moving at a velocity:

$$v_{278} = \left(1 + \frac{R-H}{R}\right)v \quad (2)$$

Or, in other words, the wheel top point 278 is moving at a velocity (denoted by arrow 288) that is almost twice the remote vehicle velocity v.

Similarly, the wheel bottom point 274, due to the wheel rotation, is moving at a velocity:

$$v_{274} = \left(1 - \frac{R-H}{R}\right)v \quad (3)$$

Or, in other words, the wheel bottom point 274 is moving at an absolute velocity (denoted by arrow 284) that is slightly greater than zero.

Wheels are good radar reflectors, so many radar points are likely to be returned from the wheel 270. Assuming that the wheel 270 is not perfectly perpendicular to the sight line of the radar sensors 306/308, the different velocities of the points on the wheel—as illustrated by the points 274/276/278—will result in different Doppler range-rate measurements by the radar sensors 306/308. Thus, if the sensors 306/308 detect multiple radar points at essentially the same location, with dramatically different range-rate values, these clusters of points can be considered to be a wheel on the remote vehicle 400.

Figure 11:
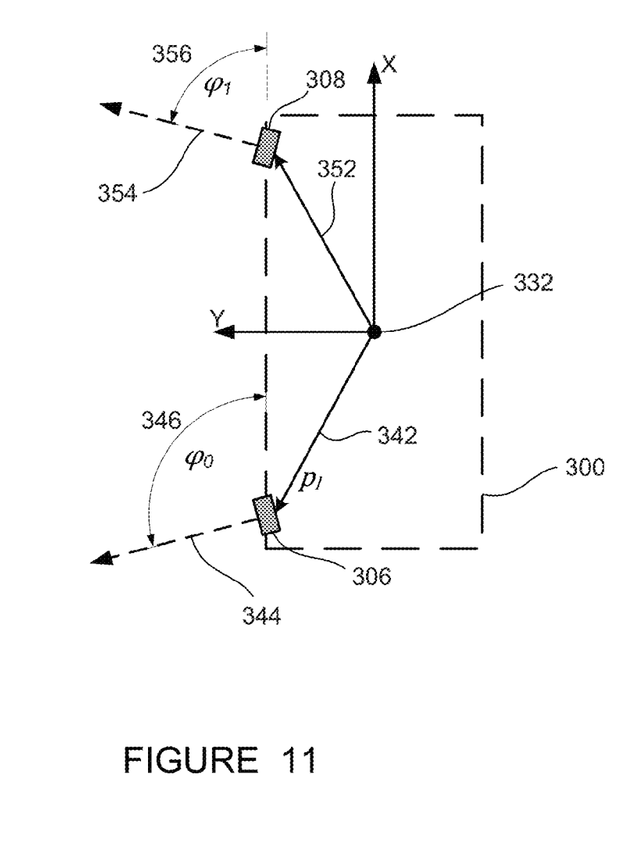
FIGS. 11 and 12 are top-view diagrams of the host vehicle and the remote vehicle of FIG. 9, illustrating the principles and geometric relationships on which wheel detection, remote vehicle tracking and radar sensor calibration are based.
Figure 12:
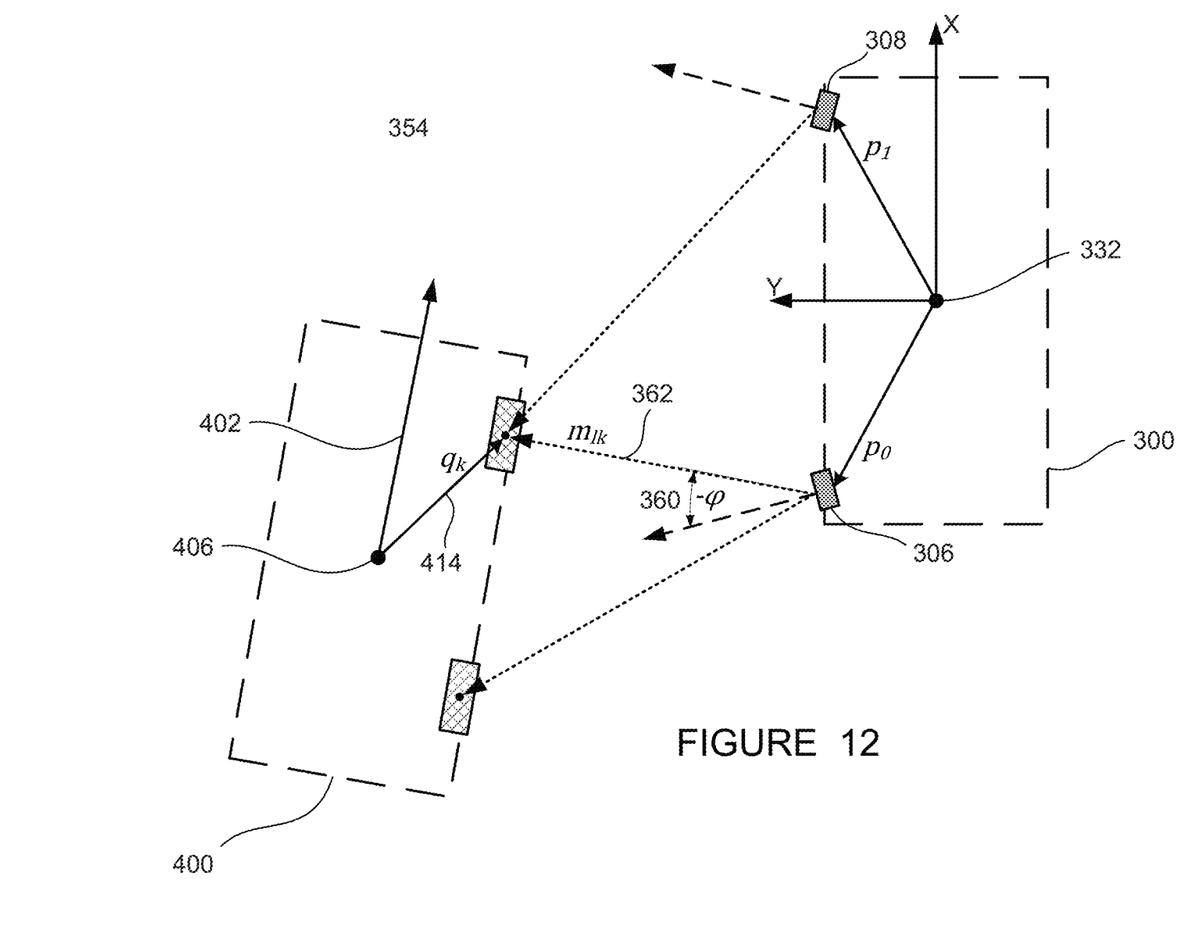

In order to use remote vehicle wheel locations to track the remote vehicle 400 and calibrate the radar sensor aiming angles, the locations of the wheels on the remote vehicle 400 must first be identified in the radar data. FIGS. 11 and 12 are top-view diagrams of the host vehicle 300 and the remote vehicle 400, illustrating the principles and geometric relationships on which the following discussion and calculations—describing wheel detection, remote vehicle tracking and radar sensor calibration—are based.

The host vehicle 300 has a centroid 332 which serves as the origin of an X-Y coordinate frame as shown. The radar sensors 306 and 308 are each located at a position $p_l$ in the host vehicle frame, where l=0,1. Thus, the radar sensor 306 may be designated as $R_0$ located at a position $p_0$ (designated by vector 342), and the radar sensor 308 may be designated as $R_1$ located at a position $p_1$ (designated by vector 352). Similarly, the radar sensor 306 ($R_0$) has a sight line 344 which is situated at an angle $\phi_0$ (angular measure 346) from the straight-ahead (X) direction of the host vehicle 300, and the radar sensor 308 ($R_1$) has a sight line 354 which is situated at an angle $\phi_1$ (angular measure 356) from the straight-ahead (X) direction of the host vehicle 300.

The remote vehicle 400 has a centroid 406, and is moving with a velocity v along the vector 402, which is at an angle θ (angular measure 408) from the straight-ahead (X) direction of the host vehicle 300. The remote vehicle 400 has right-side wheels 410 and 412. For the purposes of this discussion, the remote vehicle 400 is a car or truck with four wheels (two on each side); however, the wheel detection method is equally applicable to remote vehicles with two wheels (motorcycles) and remote vehicles with more than four wheels (trucks and buses). Each of the wheels on the remote vehicle 400 are located at a position $q_k$ (designated by vector 414) in the remote vehicle frame, where k=0, . . . , 3.

As discussed above, the first task is to detect the wheels 410 and 412 on the remote vehicle 400, which is done by identifying clusters of radar points at the same location with a range of Doppler (range rate) measurements. For the wheel 270 of FIG. 10, the relative velocity $\vec{v}$ of the wheel top point 278 with respect to the host vehicle 300, a component of which is equal to the range rate of the point 278 which would be detected by the radar sensors 306/308, can be defined as:

$$\vec{v} = \begin{bmatrix} \left(1+\frac{r}{R}\right)v\cos(\theta)-v_H \\ \left(1+\frac{r}{R}\right)v\sin(\theta) \end{bmatrix} \quad (4)$$

Where r is the wheel radius, R is the tire radius, v is the velocity of the remote vehicle 400, θ is the heading angle of the remote vehicle 400 and $v_H$ is the velocity of the host vehicle 300.

Similarly, the wheel bottom point 274 is moving at a relative velocity with respect to the host vehicle 300 which can be obtained by using a variation of Equation (4) where the (1+r/R) factor is replaced by (1−r/R). In most circumstances, the wheel bottom point 274 will be moving away from the host vehicle 300.

For the radar sensor 306 ($R_0$) measuring one of the wheels on the remote vehicle 400, as shown in FIGS. 11 and 12, a radial ray unit vector $\vec{n}$ can be defined as:

$$\vec{n} = [\cos(\phi+\phi_0)\sin(\phi+\phi_0)]^T \quad (5)$$

Where φ, as shown in FIG. 12, is the azimuth measurement angle of the remote vehicle wheel relative to the sight line 344 of the radar sensor (denoted by angular measure 360, and shown as −φ because it is measured clockwise from the sight line 344, where $\phi_0$ is measured counter-clockwise).

Knowing the relative velocity $\vec{v}$ of a point on the remote vehicle's wheel (from Equation 4) and the radial ray unit vector $\vec{n}$ from the radar sensor to the wheel (from Equation 5), the expected Doppler measurement D of the point on the remote vehicle's wheel can be determined as:

$$D = \vec{v} \cdot \vec{n} \quad (6)$$

Figure 13:
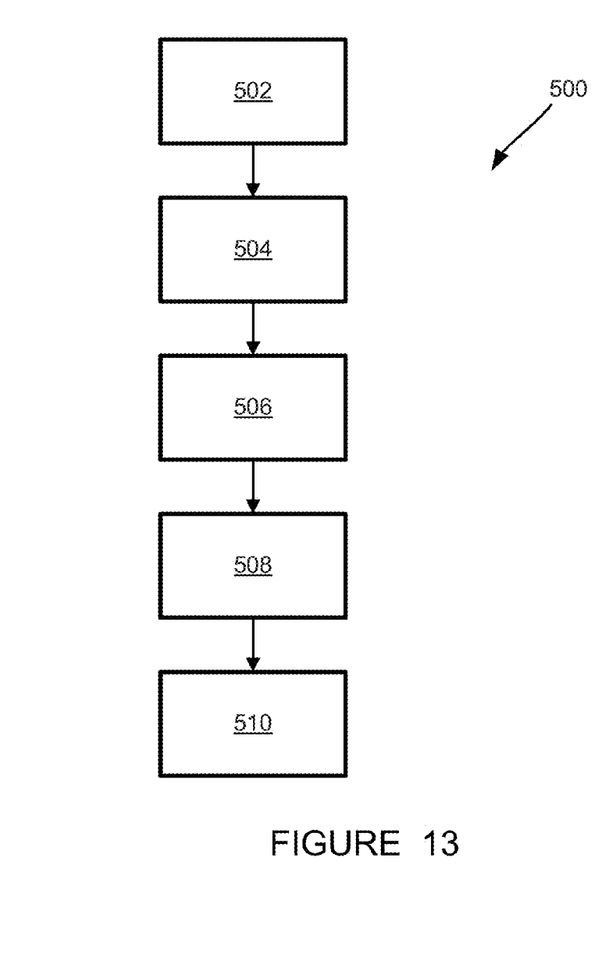
FIG. 13 is a flowchart diagram of a method for detecting a remote vehicle's wheels based on the measurement technique described and shown on FIGS. 11 and 12.

FIG. 13 is a flowchart diagram 500 of a method for detecting a remote vehicle's wheels based on the measurement technique discussed above. At box 502, sensor points are acquired for the radar sensors 306 and 308. Each sensor point i has range, Doppler and azimuth angle. That is, each sensor point includes ($r_i, D_i, \alpha_i$) for i=1, . . . , N. At box 504, radar points are clustered into groups based on positional proximity (range r, and azimuth angle α). One technique for clustering radar points into groups is to assign points i and j to the same cluster if and only if:

$$\frac{|r_i - r_j|}{\sigma_r} - \frac{|\alpha_i - \alpha_j|}{\sigma_\alpha} \le 1 \quad (7)$$

Where $\sigma_r$ and $\sigma_\alpha$ are tunable calibration values, and the range r and angle α were described above.

At box 506, the Doppler value of all of the radar points in each of the clusters identified in Equation (7) is evaluated. If a cluster of points has Doppler values in a range as described by Equations (4)-(6) (including some points moving toward the host vehicle 300 and some points moving away from the host vehicle 300), then that cluster is identified as a wheel on the remote vehicle 400. At box 508, a wheelbase W of the remote vehicle 400 is calculated if two wheels are detected on the remote vehicle 400, most likely the two wheels on the side nearest the host vehicle 300. The wheelbase W is calculated as the distance between the centers of the two detected wheels. The centers of the wheels may be identified as the radar points nearest the geometric center of the points included in the wheel cluster. Knowing the locations of the wheel center points from the range r and the azimuth angle α, calculating a distance between the two points is straightforward. At box 510, the orientation angle θ of the remote vehicle 400 (angular measure 408) is calculated if two wheels are detected on the remote vehicle 400. Calculation of the orientation angle θ is also straightforward, given the locations of the two wheel center points.

Figure 14:
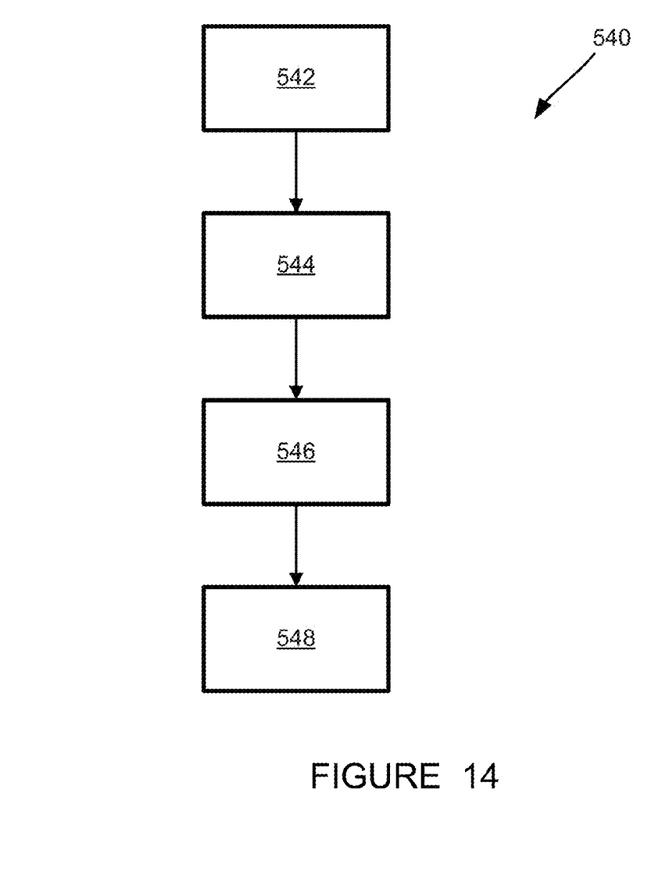
FIG. 14 is a flowchart diagram of a method for simultaneously tracking the remote vehicle and calibrating the alignment angles of the radar sensors using remote vehicle wheel detection.

FIG. 14 is a flowchart diagram 540 of a method for simultaneously tracking the remote vehicle 400 and calibrating the alignment angles of the radar sensors 306/308 using remote vehicle wheel detection. The method steps of the flowchart diagram 540 may be performed by the object sensing fusion system 302 on the host vehicle 300. At box 542, radar point data is provided by the radar sensors 306/308. For the purposes of this discussion, the data from the box 542 is provided to, and all subsequent calculations are performed on, the object sensing fusion system 302—which includes a microprocessor and a memory module as discussed previously. At box 544, wheels are identified on the remote vehicle 400 in the radar point data from the sensors 306/308. If two wheels are identified, the orientation angle θ is also calculated at the box 544. Details of the steps involved in identifying the wheels of the remote vehicle 400 and calculating the orientation angle θ were provided in FIG. 13, discussed above.

At box 546, the position, orientation and velocity of the remote vehicle 400 are tracked using the wheels detected by the radar sensors 306 and 308. The state of the remote vehicle 400 is modeled as $s=(x,y,v_x,v_y)$, representing the center position $r=(x,y)^T$, and ground velocity $v=(v_x, v_y)^T$, of the remote vehicle 400. The heading or orientation angle θ of the remote vehicle 400 is related to the x and y velocities by $\theta = \tan^{-1}(v_y, v_x)$.

As described above in the discussion of FIGS. 11 and 12, the wheels on the remote vehicle 400 can be identified by a number k=0, . . . , 3, where each wheel is at a position $q_k$ in the remote vehicle reference frame. As also described above, the radar sensors 306/308 on the host vehicle 300 can be identified by a number l=0,1, where each sensor is at a position $p_l$ in the host vehicle reference frame and has a sight line angle $\phi_l$ from the straight-ahead (X) direction of the host vehicle 300.

Given the above, a general notation can be defined where the position of the k-th wheel measured by the l-th radar sensor is known as $m_{lk}$.

Next, a rotational matrix Rot is defined, where Rot is used to rotate point coordinates as necessary based on the angles θ and ϕ. The matrix Rot is defined as:

$$Rot(\varphi) = \begin{bmatrix} \cos\varphi & -\sin\varphi \\ \sin\varphi & \cos\varphi \end{bmatrix} \quad (8)$$

The measurement equation for the k-th wheel measured by the l-th radar sensor (for k=0, . . . , 3 and l=0,1) based on the state s of the remote vehicle 400 is then defined as:

$$h_{lk}(s) \equiv Rot(-\phi_l)(r+Rot(\theta)q_k-p_l)=m_{lk} \quad (9)$$

Where $h_{lk}$ is a function of the remote vehicle state s, and the other variables were are described in the discussion above. Equation (9) can be recursively solved to optimally estimate the state S based on each new wheel position measurement $m_{lk}$. In one non-limiting embodiment, Equation (9) is programmed in a Kalman Filter routine to solve for the state s.

By continuously solving Equation (9) using all available wheel measurements, the state of the remote vehicle 400 $(x,y,v_x,v_y,\theta)$ can be tracked by the host vehicle 300 at the box 546 as long as the remote vehicle 400 remains within the region of interest of the host vehicle 300.

At box 548, the alignment angles of the radar sensors 306/308 are calibrated based on the identified locations of the wheels on the remote vehicle 400. As shown in FIGS. 11 and 12, the wheel 410 on the remote vehicle 400 may be detected by both the radar sensor 306 and the radar sensor 308, thus providing redundant measurement data. The same may also be true of the wheel 412. This redundant measurement data can be advantageously used for sensor alignment calibration.

Given the known positions of the radar sensors 306 and 308 ($p_0$ and $p_1$, respectively), and their respective sight line angles ($\phi_0$ and $\phi_1$), Equation (9) should yield the same location q for the wheel 410 whether measured by the radar sensor 306 or the radar sensor 308. In reality, however, the redundant measurements of the wheel 410 may not agree, and any difference may be attributed to sensor misalignment. If it is assumed, for example, that the alignment angle $\phi_0$ of the sensor 306 is accurate, then the alignment angle $\phi_1$ of the sensor 308 can be calibrated based on the measurement data to more closely match the position r and orientation θ of the remote vehicle 400 and the location q of the wheel 410.

Extracting the second factor from Equation (9) above, a computed expression $β_t$ can be defined as:

$$β_t=(r_t+Rot(θ_t)q_k-p_1) \quad (10)$$

Where t is a time sequence identifier, t=1, . . . , N, and the N latest values of the computed expression $β_t$ and the radar measurement $m_t$ are stored in a buffer.

A rotational alignment matrix R can be defined as R≡Rot($-\phi_1$), and can be solved by minimizing the following least-squares function:

$$\sum_{t=1}^{N} \|Rβ_t - m_t\|^2 \quad (11)$$

The following technique can be used to solve Equation (11). Let matrices P=[$β_1$, . . . , $β_N$], and M=[$m_1$, . . . , $m_N$].

Matrices U, V and S are obtained by singular value decomposition of $PM^T$. That is, $USV^T$=svd($PM^T$). The solution of the least-squares Equation (11) is $R=UCV^T$, where $$C = \begin{bmatrix} 1 & 0 \\ 0 & \det(UV^T) \end{bmatrix} \quad (12)$$

And det is the determinant operator.

With the matrix R solved for above, the estimated alignment angle for the radar sensor 308 is $\phi_1=\tan^{-1}(R_{12},R_{11})$. The alignment angle for the radar sensors 306 or 308 can be continuously calibrated at the box 548 of FIG. 14. The alignment angle can be used to adjust future measurement readings from the radar sensors 306 or 308. The tracking of the remote vehicle 400 and the simultaneous calibration of radar sensor alignment is made possible by the redundant and repeated measurement of wheels on the remote vehicle 400 by the radar sensors 306/308 on the host vehicle 300, and the fusion calculations discussed above.

The object sensing fusion system 302 may also incorporate vision data from the camera 304 in the fusion calculations discussed above, to further refine the tracking of the remote vehicle 400 and the simultaneous calibration of radar sensor alignment. This can be done by identifying wheels as salient points in the vision data and fusing the salient vision points with corresponding radar points, as discussed above with respect to the rear cross traffic avoidance (RCTA) application.

The remote vehicle tracking calculation employing radar wheel detection—described above—provides more accurate estimation of remote vehicle position, orientation and velocity than traditional object sensing methods. The accurate remote tracking can be advantageously used in a lateral collision prevention (LCP) system, where accurate knowledge of the remote vehicle's 2-D velocity is critical. Using this same fusion technique to virtually calibrate radar sensor alignment provides additional benefits to both the vehicle manufacturer and the vehicle owner/driver.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for tracking a target object which is moving in a region of interest in proximity to a host vehicle, said method comprising:

providing images from a camera onboard the host vehicle, where the images cover a field of view relative to the host vehicle;

providing data from two radar sensors onboard the host vehicle, where the radar sensors have coverage areas which overlap the field of view of the camera such that the target object is sensed by the camera and at least one of the radar sensors, and where the data from the radar sensors includes radar points identifying target object position and radial velocity;

determining that the target object is present in the region of interest based on a cue from one of the radar sensors;

analyzing the images from the camera to identify and track salient vision points on the target object, where the salient vision points include locations of locally maximal intensity variation in the images;

associating the salient vision points with the radar points, including a transformation between radar point position and salient vision point image location, where associations are based on position and motion of the salient vision points and the radar points;

computing, using a microprocessor, a velocity of the target object relative to the host vehicle, using a fusion calculation including the radar point position and radial velocity, and salient vision point motion flow; and using the velocity of the target object in a rear cross traffic avoidance (RCTA) system, where the region of interest is located to the rear of the host vehicle, and the RCTA system issues a warning when the target object is projected to imminently enter a warning zone and applies host vehicle brakes when the target object is projected to imminently enter a braking envelope.

2. The method of claim 1 wherein analyzing the images from the camera to identify and track salient vision points includes detecting the salient vision points in an image, building a correspondence between the salient vision points in two temporally adjacent images, detecting spatio-temporally stable salient vision points, and establishing a motion flow for the salient vision points.

3. The method of claim 2 wherein the motion flow is measured in pixels per second in the image.

4. The method of claim 1 wherein associating the salient vision points with the radar points includes projecting the radar points to an image plane of the salient vision points, projecting a predicted velocity of the radar points to the image plane to determine a baseline motion flow, removing salient vision points with a motion flow substantially different from the baseline motion flow from consideration, and assigning remaining salient vision points to a nearest radar point.

5. The method of claim 4 wherein removing salient vision points with a motion flow substantially different from the baseline motion flow includes identifying and removing salient vision points whose motion flow differs from the baseline motion flow by an amount exceeding a predetermined threshold.

6. The method of claim 4 wherein assigning remaining salient vision points to a nearest radar point includes identifying the nearest radar point based on a distance measured in horizontal pixels in the image plane.

7. The method of claim 1 wherein the target object is a remote vehicle which is being driven in the region of interest.

8. The method of claim 7 wherein the salient vision points on the remote vehicle include wheels, door handles, head lights, tail lights, external mirrors and intersections of pillars with body panels.

9. A method for tracking a remote vehicle which is moving in a region of interest in proximity to a host vehicle, said method comprising:

providing images from a camera onboard the host vehicle, where the images cover a field of view relative to the host vehicle;

providing data from two radar sensors onboard the host vehicle, where the radar sensors have coverage areas which overlap the field of view of the camera such that the remote vehicle is sensed by the camera and at least one of the radar sensors, and where the data from the radar sensors includes radar points identifying remote vehicle position and radial velocity;

determining that the remote vehicle is present in the region of interest based on a cue from one of the radar sensors;

analyzing the images from the camera to identify and track salient vision points on the remote vehicle, where the salient vision points include locations of locally maximal intensity variation in the images, including wheels, door handles, head lights, tail lights, external mirrors and intersections of pillars with body panels;

associating the salient vision points with the radar points, including a transformation between radar point position and salient vision point image location, where associations are based on position and motion of the salient vision points and the radar points; and computing, using a microprocessor, a velocity of the remote vehicle relative to the host vehicle, using a fusion calculation including the radar point position and radial velocity, and salient vision point motion flow; and using the velocity of the remote vehicle in a collision avoidance system on the host vehicle, where the region of interest is located to the rear of the host vehicle, the collision avoidance system is a rear cross traffic avoidance (RCTA) system, and the RCTA system issues a warning when the remote vehicle is projected to imminently enter a warning zone and applies host vehicle brakes when the remote vehicle is projected to imminently enter a braking envelope.

10. The method of claim 9 wherein analyzing the images from the camera to identify and track salient vision points includes detecting the salient vision points in an image, building a correspondence between the salient vision points in two temporally adjacent images, detecting spatio-temporally stable salient vision points, and establishing a motion flow for the salient vision points.

11. The method of claim 9 wherein associating the salient vision points with the radar points includes projecting the radar points to an image plane of the salient vision points, projecting a predicted velocity of the radar points to the image plane to determine a baseline motion flow, removing salient vision points with a motion flow substantially different from the baseline motion flow from consideration, and assigning remaining salient vision points to a nearest radar point.

12. An object detection system for a host vehicle, said system comprising:

a camera onboard the host vehicle, said camera providing images which cover a field of view relative to the host vehicle;

two radar sensors onboard the host vehicle, where the radar sensors have coverage areas which overlap the field of view of the camera such that a target object is sensed by the camera and at least one of the radar sensors, and where the radar sensors provide radar points identifying target object position and radial velocity; and an object detection processor including a microprocessor and a memory module, said processor being programmed to:

determine that the target object is present in a region of interest based on a cue from one of the radar sensors;

analyze the images from the camera to identify and track salient vision points on the target object, where the salient vision points include locations of locally maximal intensity variation in the images;

associate the salient vision points with the radar points, including a transformation between radar point position and salient vision point image location, where associations are based on position and motion of the salient vision points and the radar points; and compute a velocity of the target object relative to the host vehicle, using a fusion calculation including the radar point position and radial velocity, and salient vision point motion flow.

13. The object detection system of claim 12 wherein analyzing the images from the camera to identify and track salient vision points includes detecting the salient vision points in an image, building a correspondence between the salient vision points in two temporally adjacent images, detecting spatio-temporally stable salient vision points, and establishing a motion flow for the salient vision points.

14. The object detection system of claim 12 wherein associating the salient vision points with the radar points includes projecting the radar points to an image plane of the salient vision points, projecting a predicted velocity of the radar points to the image plane to determine a baseline motion flow, removing salient vision points with a motion flow substantially different from the baseline motion flow from consideration, and assigning remaining salient vision points to a nearest radar point based on a distance measured in horizontal pixels in the image plane.

15. The object detection system of claim 14 wherein removing salient vision points with a motion flow substantially different from the baseline motion flow includes identifying and removing salient vision points whose motion flow differs from the baseline motion flow by an amount exceeding a predetermined threshold.

16. The object detection system of claim 12 wherein the target object is a remote vehicle which is being driven in the region of interest.

17. The object detection system of claim 16 wherein the salient vision points on the remote vehicle include wheels, door handles, head lights, tail lights, external mirrors and intersections of pillars with body panels.

18. The object detection system of claim 16 wherein the region of interest is located to the rear of the host vehicle, the object detection system provides position and velocity data for the remote vehicle to a rear cross traffic avoidance (RCTA) system, and the RCTA system issues a warning if the remote vehicle is projected to imminently enter a warning zone and applies host vehicle brakes if the remote vehicle is projected to imminently enter a braking envelope.

* * * * *